United States Patent [19]

Hanlon

[11] 3,715,461

[45] Feb. 6, 1973

[54] COLOR INFORMATION ON BLACK AND WHITE FILM

[76] Inventor: Thomas F. Hanlon, 337 Tremont Avenue, Fort Lee, N.J. 07024

[22] Filed: Oct. 28, 1970

[21] Appl. No.: 84,570

[52] U.S. Cl. ............178/5.2 R, 178/5.2 ST, 350/317

[51] Int. Cl. ..............................................H04n 9/02

[58] Field of Search ......178/5.2, 5.4, 5.4 ST; 96/117, 96/118; 350/317

[56] References Cited

UNITED STATES PATENTS

| | | | |
|---|---|---|---|
| 1,912,700 | 6/1933 | Fritts | 96/117 X |
| 3,591,709 | 7/1971 | Takagi | 178/5.4 ST |
| 2,892,883 | 6/1959 | Jesty et al. | 178/5.4 ST |

*Primary Examiner*—Richard Murray
*Attorney*—Cushman, Darby & Cushman

[57] ABSTRACT

A method and apparatus for recording and reading out programmed color information on black and white film and black and white film with such information coded thereon. In one embodiment, a line screen or filter having a number of sets of contiguous red, green and blue lines of differing width is placed atop a piece of black and white film to record a color coded image. After development, the film can be scanned and the color associated with a line being scanned ascertained and employed to operate an electron beam for producing the proper color or producing a laser beam of the proper color by the width of the scanned line.

13 Claims, 7 Drawing Figures

INVENTOR

THOMAS F. HANLON

BY Cushman, Darby & Cushman

ATTORNEYS

INVENTOR
THOMAS F. HANLON
BY Cushman, Darby & Cushman
ATTORNEYS

INVENTOR
THOMAS F. HANLON
BY Cushman, Darby & Cushman
ATTORNEYS

COLOR INFORMATION ON BLACK AND WHITE FILM

BRIEF DESCRIPTION OF THE PRIOR ART AND SUMMARY OF THE INVENTION

The invention is described in Document Disclosure 395 received in the patent office on Aug. 25, 1969 and available in the United States Patent Office.

The invention relates to a method and apparatus for recording and reading out programmed color information on black and white photographic film and black and white film with such information color coded thereon.

Many circumstances exist in which it is necessary or desirable to record information in the form of a pattern of light having at different points different densities and colors, for example, photographing in color a picture of an object or scene. While color films are available which will produce a satisfactory reproduction of such a pattern in most instances, such film is expensive compared to common black and white film and may not produce a satisfactory reproduction for all applications. Accordingly, several different techniques have been developed for color coding information onto relatively inexpensive black and white film.

In one approach, termed the "line screen process," a line screen or filter comprising a large number of contiguous sets of red, green and blue line filters is disposed between the source of the light which forms the image of the pattern to be reproduced and conventional black and white film. The technique is particularly satisfactory with black and white film of the type known as Kalvar and described in the U.S. Pats. No. 3,032,414, 3,161,511, and 3,251,690, for example. To use such film, the original negative can be photographed through the color filters onto a color sensitive negative and a positive printed from this to Kalvar. By using an electronic vidicon or other similar tube which acts as the negative or positive and converts the color scanned to positive or negative black and white densities, direct recording to Kalvar can be done provided the receiving CRT has a P-16 phosphor (output light at 3850 angstroms) which is the light range to which Kalvar is sensitive. The red filters block transmission of red light so that the portion of the film immediately below each of the red filters receives the blue and green components of the incident light only and these components accordingly control the deposit of metallic silver or some other light absorbtion or light scattering medium onto the black and white film. The portions of the film directly beneath the green and blue filters are similarly exposed to the incident light without the green and blue components respectively. Accordingly, if the film is developed to produce a negative print and this printed to produce a positive print, mounting the positive print in exact registery with the line screen or filter results in a true color reproduction which can be viewed or used in the same fashion as any other photograph. If the number of sets of three-color filters per unit of length on the film is large enough, the discrete lines of red, green and blue colors will not be apparent and the photograph will appear to be continuous. This process is discussed further in Friedmen's HISTORY OF COLOR PHOTOGRAPHY, American Photography Publishing Co., 1944.

The primary difficulty with this approach is that it is extremely difficult to properly align the filter with the developed, positive print. If the film is improperly aligned with the filter or if the pattern of lines on the print becomes distorted during development with respect to the pattern on the filter, the reproduction is unsatisfactory for most purposes.

The present invention relates to a system of recording and reading out colored coded information on conventional black and white film which is similar to the line screen process. In the embodiments of the invention discussed in detail below, the width of each of the three color filters of each set differs from the width of the other line filters of that set. Preferably, the red filter comprises 40 percent of the width of the set, the green filter 35 percent and the blue filter 25 percent. Because the width each of the color lines on the filter, and on the film as well, varies from the widths of the lines of different color, the resulting black and white image on the film may be easily scanned by a flying spot scanner to generate electrical signals which can be easily analyzed to recognize the color of a line being scanned on the black and white film, and accordingly operate a device for reproducing a line of that color of the proper intensity on a screen or other viewing apparatus.

In one embodiment of the invention as described in detail below, black and white film produced in the manner discussed above with a plurality of sets of red, green and blue color lines each having differing widths is scanned by a flying spot scanner to generate electrical signals having a characteristic which varies with intensity of the light passing through or reflected from the portion of the film being scanned. This signal is transmitted to a comparator circuit which, by determining the width of a line or stripe which has just been scanned, ascertains the coded color of that line or stripe or the next line or stripe. The comparator circuit then actuates a red, blue or green electron gun accordingly, so that the electrical signals derived from the scanner cause the proper gun to produce a color line of the scanned intensity.

According to another embodiment of the invention, a three-color laser which is capable of producing coherent light pulses of red, blue or green sequentially scans a film produced in the above manner. Electrical signals derived from light transmitted through or reflected from this film are passed to a comparator circuit which determines the color coded line being scanned and causes the laser to produce a pulse of the appropriate color of the line which then passes through the film and is projected onto a screen at the desired intensity.

According to a further embodiment of the invention, film produced in the above-mentioned manner is scanned by a laser flying spot scanner or cathode ray scanner to produce a diffraction pattern. Since each of the three color lines or stripes has a different width, the first order images of the lines or stripes will appear at different locations in space. Photomultiplier tubes or other devices, such as conventional television cameras, can then be disposed at the locations, for example, where the first order red, green and blue images appear, respectively, to generate signals which can be applied, for example, to red, green and blue electron guns for producing a color picture on a conventional television screen or the like. Alternately, the signals can be employed to pulse a laser of the type which produces three colors as described above.

Many other objects and purposes of the invention will become clear from the following detailed description of the drawings.

DETAILED DESCRIPTION OF THE DRAWINGS

Figure 1:
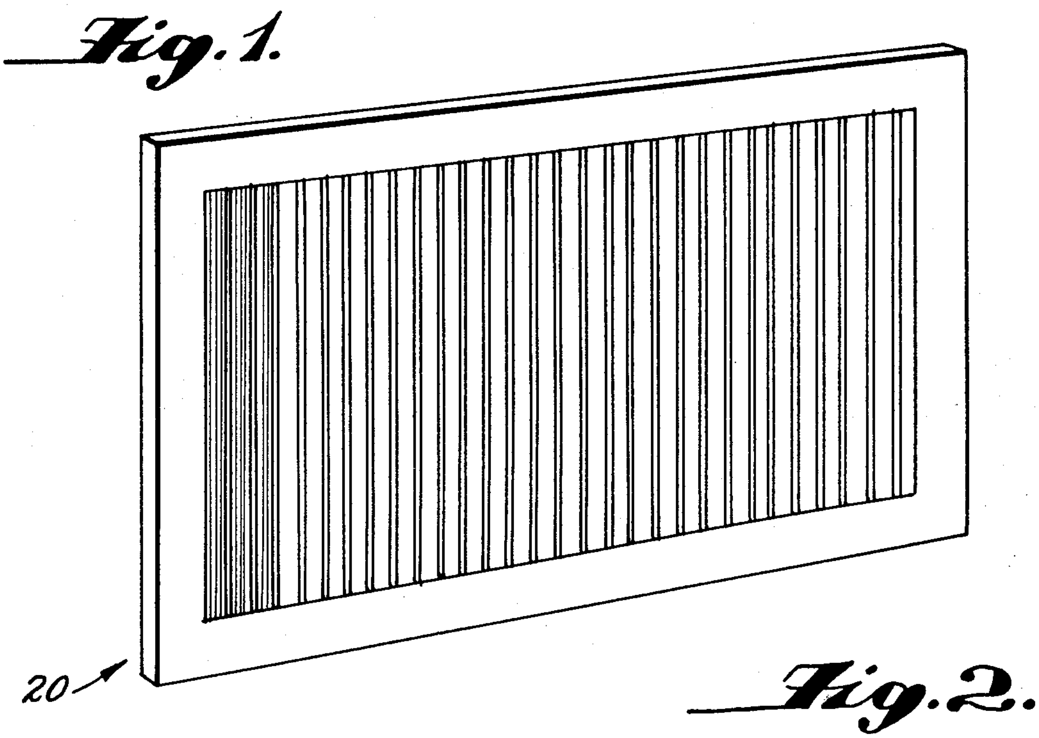
FIG. 1 shows a filter or line screen having a plurality of sets of red, green and blue line filters.

Reference is now made to FIG. 1 which shows a line screen or filter 20 suitable for use in this invention above. In this view the width of each of the color lines of filter 20 has been deliberately enlarged so that they are visible. Normally, the number of color lines per inch will be of the order of 900 so that the filter 20 will appear to be gray or pink when viewed with a white light.

Figure 2:
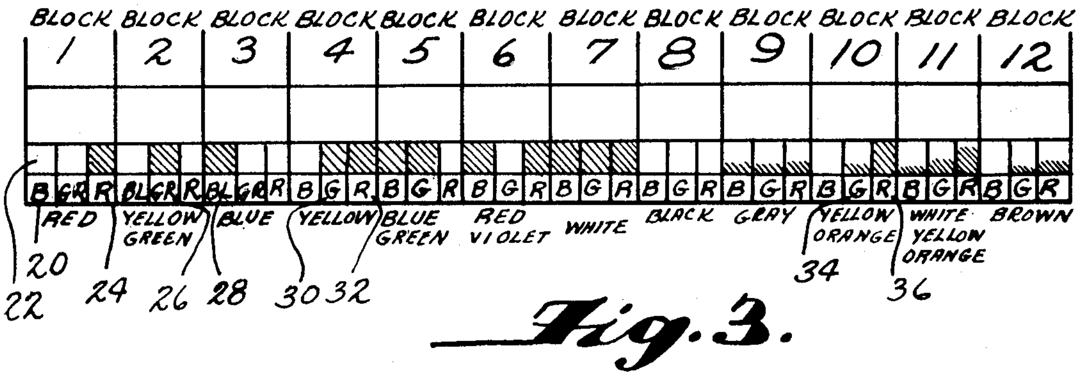
FIG. 2 shows a diagrammatic view of a portion of black and white with a filter overlaying it illustrating the manner in which color information is coded onto the black and white film.

In FIG. 2 a filter 20 is diagrammatically shown adjacent a conventional strip of black and white film 22. As mentioned above, filter 20 is comprised of a plurality of sets of blue, green and red line filters contiguously disposed along the length of filter 20. When red light is directed onto one of the sets of filter 20, for example, the set associated with block 1 in FIG. 2, the red filter line or stripe 24 allows transmission of the red light. Accordingly, on the film underneath the set of filter color lines designated as block 1, only the portion under red line 24 will be darkened by subsequent single development of the film. If the invention is employed with a type of film in which dark areas are produced by development only in regions where no light passes through the film, the film beneath blue and green lines would appear dark, and the portion beneath the red lines would be clear after a single development.

Similarly, in the portion of the film beneath the set of color lines designated as block 2 in FIG. 2, only the portion beneath the green line 26 darkens upon development when that block is subjected to yellow-green light as shown. In block 3, blue light causes the portion of the film beneath blue color line 28 to darken and in block 4, the portions of the film beneath green stripe 30 and red stripe 32 are darkened when yellow light is incident upon filter 20. In blocks 5–8, the effect of blue-green, red-violet, white and black light is illustrated.

When gray light is incident upon filter 20, as can be seen in block 9, the portions of the film beneath the blue, green and red color stripes are all partially darkened. Similarly, yellow-orange light causes a partial darkening of the portion of film 22 beneath green color line 34 and a complete darkening of the portion of the film beneath red color stripe 36. White, yellow-orange light and brown light causes similar partially darkening of some portions of the film beneath certain color lines and full darkening beneath others. By a complete or partial covering of the film beneath one or more color lines, all color tones, with their darkened or lightened tints, can be formed on the film and this result permits a complete reproduction and recording of all colors of the spectrum.

Thus, light incident upon the photographic plate 22 is split up by line filter 20 into three parts and the deposits under the same on the black and white photographic plate 20 represent the red, green and blue parts of the incident image. If the film thus exposed is developed, fixed and placed in contact with a similarly colored plate so that the red, blue and green stripes fall in the same places, a negative or complementary colored picture results. If, however, a positive transparency from this negative is made by printing and then covered with the linear colored plate, a positive picture in the true colors of the original will be formed. The opaque parts in the negative are now transparent and, therefore, colored and the quantity or brilliancy of the colors is a function of the deposited material on the negative. However, as pointed out above, overlying the developed film exactly with the original filter is difficult and seldom can be satisfactorily accomplished in practice.

Figure 3:
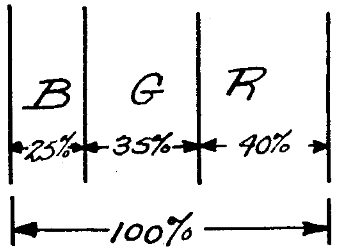
FIG. 3 shows diagrammatic view illustrating the relative widths of the red, green and blue lines of the filter green or film.

Reference is now made to FIG. 3 which shows the relative widths of the three color lines which comprise each of the sets of the screen filter which are imposed upon the black and white film. As shown, the blue color stripe preferably comprises roughly 25 percent of the set width and the green and red stripes 35 and 40 percent, respectively. From colorimetric analysis it is known that most blue filters transmit with a greater intensity and that blue records on most films with a greater intensity than red. Similarly, green transmits and records with an intensity which is less than blue but greater than red. Accordingly, it is desirable that the relative division of each of the sets into the three color stripes should take advantage of this differing intensity so that the specific widths can compensate for color transmission variance and at the same time use this width variance for detecting the location of each color stripe. It has been determined that a division whereby the red stripe comprises 40 percent of the total set width, the green stripe 35 percent and the blue stripe 25 percent is particularly satisfactory, although other widths can, of course, be employed and utilized to detect each color line.

Figure 4:
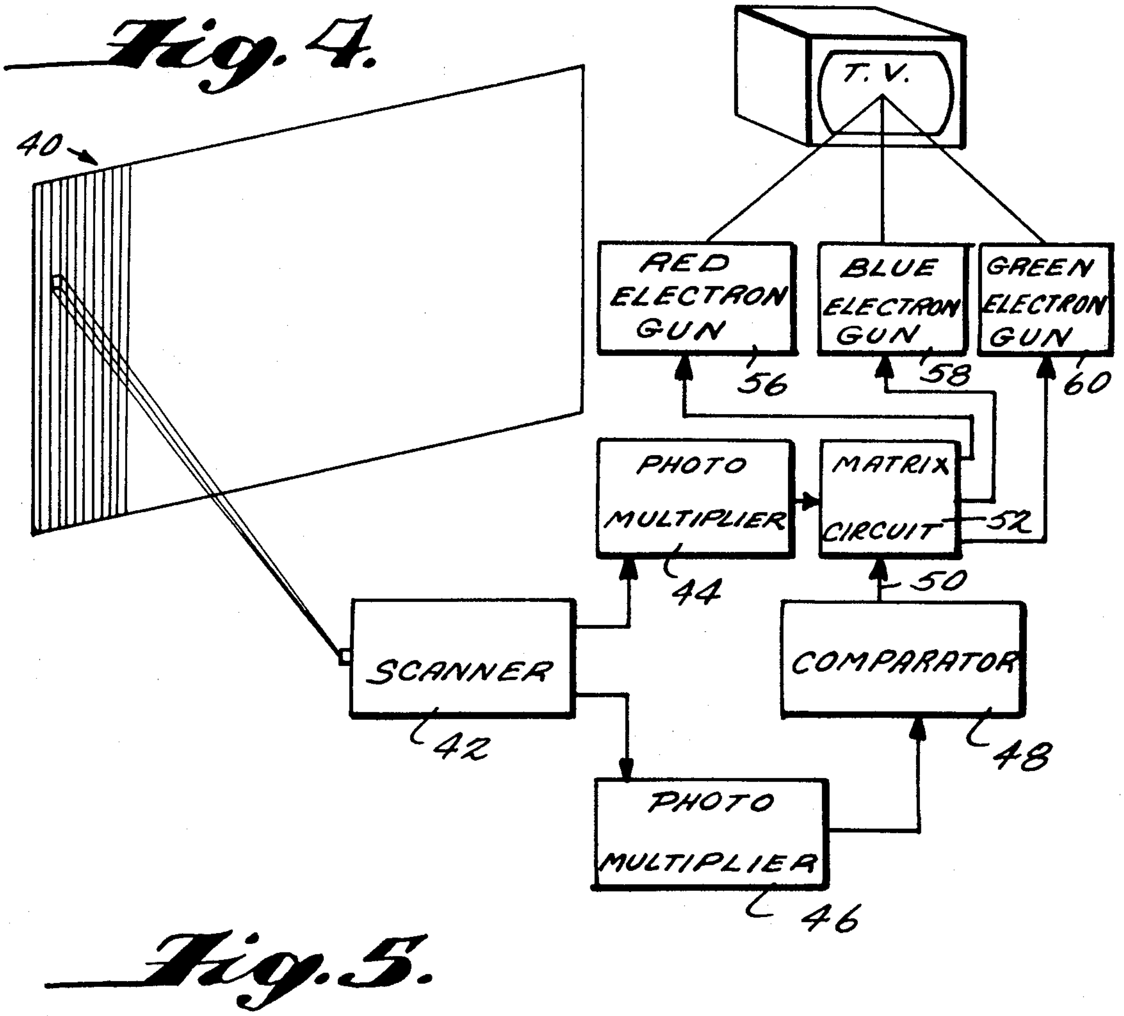
FIG. 4 shows a schematic block diagram of one embodiment of the invention for reading out color information coded on black and white film.

Reference is now made to FIG. 4 which shows one embodiment of the invention for deriving coded information from a piece of film 40 which has been produced and developed as indicated above, and which has color coded sets of blue, green and red stripes each having a different width and preferably having the width division depicted in FIG. 3. In this embodiment, a conventional flying spot scanner 42, which may include a cathode ray tube, sequentially scans areas across developed film 40. Preferably, scanner 42 scans all the discrete areas along a horizontal line on film 40 and then shifts vertically to repeat the horizontal scan along a parallel line.

The detected light at each scanned location which is reflected from film 42, or detected as passing through film 40, is transmitted by any suitable means to two conventional photomultipliers 44 and 46 which each produce an electrical signal which has a characteristic, for example, photomultiplier 44 detects amplitude, which varies with the intensity of the incident light. Photomultiplier 46 detects the line widths and feeds comparator 48. Since the intensity in contiguous blue, green and red color stripes of a single or adjoining set is normally quite different, the width of a stripe being scanned can be easily ascertained from the electrical signal. Moreover, since the color stripes are always ordered in each set in the same fashion, the color of the next stripe to be scanned can always be ascertained by comparator 48 from the width of the stripe just scanned or from the width of any previously scanned stripe. Comparator 48 compares the stripes with each other on the time axis. Further, comparator 48 preferably contains a memory for retaining position when black and white information is being scanned. The function of determining the color associated with the stripe being scanned is carried out by comparator 48 and suitable circuitry for accomplishing this function will be apparent to anyone of ordinary skill in the art.

Comparator 48 thus produces a signal on output line 50 which indicates the color of the stripe which is currently being scanned. The electrical signal produced by photomultiplier 44 which indicates the intensity of the incident light as derived from the scan across the width of the stripe is conveyed to matrix circuitry 52 from photomultiplier 44 and matrix circuit 52 in turn produces a signal which is transmitted to red electron gun 56, blue electron gun 58 or green electron gun 60 in accordance with the color stripe which comparator 48 indicates is currently being scanned, and which causes the chosen gun to produce a beam of the proper intensity. The electron guns 56, 58 and 60 can then be employed to produce a color picture, for example, on a conventional color television, which will be a true color reproduction of the pattern coded onto black and white film 40. Each color density as scanned is thus fed to its matching electron beam, where the three beams are combined by a color television tube to produce a full color image of the scanned black and white film.

Figure 5:
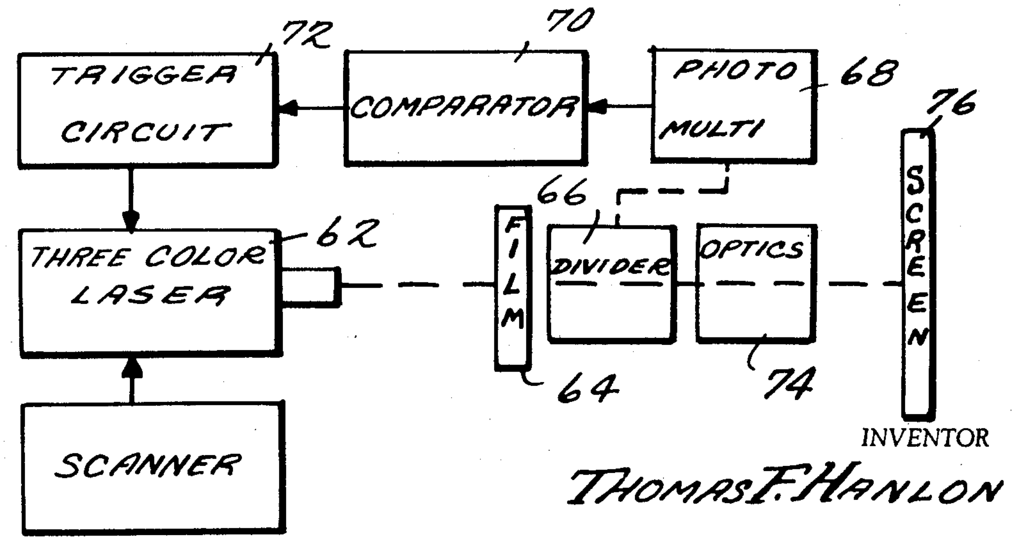
FIG. 5 shows a further embodiment of the invention for reproducing of a color coded pattern on black and white film.

FIG. 5 illustrates another embodiment of the invention similar to that of FIG. 4. In this embodiment, for example, which might be suitable for reproducing a movie or the like on a theater screen, a three-color laser 62 is employed as a light source for they system. Laser 62 is of a type which is well known and which is capable of producing pulses of red, blue or green light. The light from laser 62 is scanned across film 64 in the same manner as scanner 42 scans film 40 as described above. A portion of the light passing through film 64 is transmitted via a conventional optical device 66, for example, half-silvered mirror, to a photomultiplier or other similar device 68 which produces an electrical signal having a characteristic which varies with the intensity of the scanned beam. Alternately, the photomultiplier 44 and 46 can be disposed behind film 64 to detect the light passing through film 64. As in the embodiment of FIG. 4, the electrical signal produced by photomultiplier 68 is passed to comparator 70 which determines the color of the stripe which is currently being scanned. As mentioned above, since the three-color stripes which comprise each set are always ordered in the same fashion, it is a simple task for comparator 70 to predict the next color to be produced from a determination of the color of the last stripe to be scanned. The signal produced by comparator 70 is transmitted to a trigger circuit 72 which causes laser 62 to produce a pulse of the proper color for passage through the color stripe currently being scanned. A portion of the light passing through film 64 is also projected via suitable optics 74 onto a screen 76 where it can be viewed.

Figure 6:
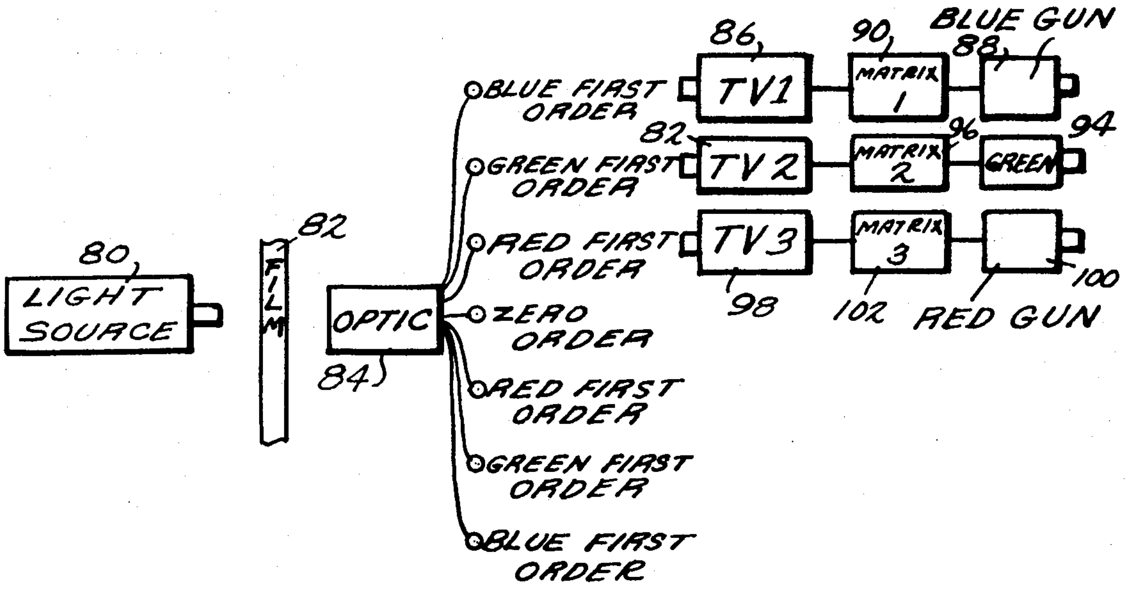
FIG. 6 shows a further embodiment of the invention for producing a diffraction pattern from the color coded pattern on the film and generating a reproduction of the pattern from the diffraction pattern.

FIG. 6 illustrates another embodiment of the invention whereby Fourier transform techniques are utilized for reproducing line screen black and white films in color. In the embodiment illustrated in FIG. 6, a light source 80 produces a beam which is transmitted through film 82, which is the type discussed above. The resultant image passes through suitable optical devices 84 to produce a diffraction pattern as shown. In terms of a Fourier transform, the diffraction patterns produced by lines of three different widths on a line screen black and white film appear at different locations in space because of the differing widths of the color lines. As shown in FIG. 6, the distances between the zero order image and the red, green and blue first order images are proportional to the special frequency of lines in the line screen pattern which bears the color information.

The first order diffraction corresponds to the fundamental frequency of the Fourier series which can be used to represent the lines of the line screen. The wave length of this fundamental frequency is equal to the distance between the lines of the line screen image. Reducing the line spacing causes the two first order images to be spaced further apart. Thus if the line spacings representing the color information of the three primary colors are of different widths, they will produce a Fourier transform first order diffraction patterns each separated from the other in a vertical pattern. Second, third and further orders of the image, of course, will be produced, but these are not normally useful.

If a different television vidicon tube or other similar device is disposed adjacent the location where the three first images respectively appear, and individual lenses utilized to focus each of the first order images into the separate vidicon tubes, a Fourier transform image of the Fourier transform will be produced on the face of each vidicon tube and the electrical signal produced by each can be employed to operate red, green and blue electron tubes or the like. In FIG. 6, vidicon tube 86 is disposed adjacent the blue first order image and produces a signal which operates blue electron gun 88 via matrix 90. Similarly, vidicon tube 92 is disposed adjacent the green first order images and operates electron tube 94 via matrix 96. Vidicon tube 98 is mounted adjacent the location at which the red first order image appears and operates the red electron gun 100 via matrix 102.

Thus, for home color television reception, the three-color diffraction pattern of the Fourier transform is imaged into three vidicon tubes which produce signals which in turn are fed to matrixing circuits, and then to each of the color producing electron beams where the modulated beams produce a complete color image on the face of a color cathode ray tube.

Figure 7:
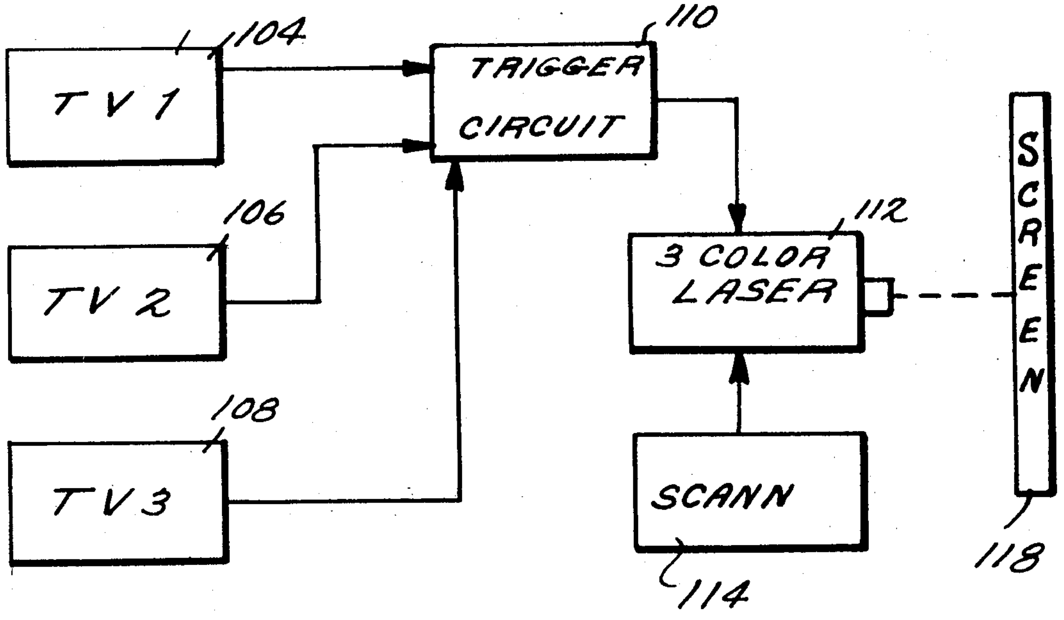
FIG. 7 shows a modification of the embodiment of FIG. 6 for reproducing a color coded pattern on black and white film using a three-color pulsed laser.

FIG. 7 illustrates another embodiment of the invention similar to that of FIG. 6 in which television cameras 104, 106 and 108 are disposed adjacent the locations at which the blue, red and green first order images, respectively, appear. The image is preferably scanned by a laser flying spot scanner and the resultant three-color images are fed to three vidicon tubes. The output of each of these three vidicons is applied to a trigger circuit 110 which recognized the vidicon tube which is applying a signal to circuit 110 and activates the associated color in the three-color laser 112, and also varies the intensity of the light produced by laser 112 in accordance with the intensity of the signals produced by vidicons 104, 106 and 108, respectively. A scanning mechanism 114 causes laser 112 to scan across the screen 118 and produce a color signal in the same manner discussed above.

Thus, each color separation point of the diffraction pattern is imaged upon a camera or photomultiplier tube of the appropriate primary color to produce signals which are fed to the pulse triggering circuit so that the proper laser color is projected in accordance with the modulation produced by the Fourier transform diffraction pattern.

The above described embodiments of the invention are suitable for reproducing still pictures, motion pictures, computer outputs and color video recordings, as well as other applications. In short, any color coded pattern may be recorded or transferred to a relatively inexpensive black and white film and all of the color information thereon programmed easily and simply retrieved and employed to generate a satisfactory reproduction. Many changes and modifications in the above described embodiments of the invention are of course possible without departing from the scope of the invention. Accordingly, that scope is intended to be limited only by the scope of the appended claims. parting from the scope of the invention. Accordingly, that scope is intended to be limited only by the scope of the appended claims.

What is claimed is:

1. A method of coding color information onto black and white film comprising the steps of:

mounting adjacent said film a three color filter having a plurality of contiguous rectangular regions, each region including three and only three non-white portions including a red responsive rectangular portion with a length extending the length of said filter and a first width, a blue responsive rectangular portion with a length extending the length of said filter and a second width differing from said first width, and a green responsive rectangular portion with a length extending the length of said filter and a third width differing from said first and second widths, and applying a color image to said filter so that each part of said film adjacent one of said red responsive portions records information as to the red component of the image incident on that red responsive portion, each part of said film adjacent one of said blue responsive portions records information as to the blue component of the image incident on that blue responsive portion and each part of said film adjacent one of said green responsive portion records information as to the green component of the image incident on that green responsive portion.

2. Apparatus for reproducing a color image code on black and white film in a plurality of contiguous rectangular regions each having three and only three non-white portions in each region extending the length of said film and each including a red coded rectangular portion of a first width, a blue coded rectangular portion of a second width differing from said first width and a green coded rectangular portion of a width differing from said first and second widths comprising:

means for scanning a source of light across the width of said film so each scan causes said source to sequentially encounter at least a part of each of said red, blue nd green coded portions of each of said regions, means for detecting at least a portion of said source of light after said light has encountered said film and for determining the width of each portion scanned so as to determine whether that portion is red, green or blue coded, means for producing a reproduction of said image on a viewing screen with first means for causing red color to appear on said screen, second means for causing a blue color to appear on said screen and third means for causing a green color to appear on said screen, and means connected to said detecting means for operating said first means when said detecting means determines that said part being scanned is coded red, operating said second means when said detecting means indicates said part being scanned is blue and operating said third part when said detecting means indicates said part being scanned is green.

3. Apparatus as in claim 2 wherein said first, second and third means include electron guns.

4. Apparatus as in claim 3 wherein said detecting and determining means includes a photomultiplier for generating an electrical signal having an amplitude which is a function of the light incident upon said photomultiplier which in turn is a function of the light transmissive characteristic of said part being scanned.

5. Apparatus as in claim 3 further including a photomultiplier for sequentially detecting the light transmitted through each said part and for generating an electrical signal having an amplitude which is a function of the light incident upon said photomultiplier and means for transmitting said electrical signal to said electron guns.

6. Apparatus as in claim 3 wherein said electron guns are in a color television.

7. Apparatus as in claim 2 wherein said light source includes laser means for producing a red, green and blue beam and wherein said first means causes said laser means to produce said red beam but not said green and blue beams, said second means causes said laser means to produce said blue beam but not said red and green beams and said third means causes said laser means to produce said green beam but not said red and blue beams.

8. Apparatus as in claim 7 wherein said producing means includes means for projecting the light transmitted through said film onto said screen.

9. Apparatus as in claim 8 wherein said detecting and determining means includes a photomultiplier for generating an electrical signal having an amplitude which is a function of the light incident upon said photomultiplier and including means for applying a portion of the light transmitted through said part to said photomultiplier.

10. Apparatus for reproducing a color image coded on black and white film in a plurality of contiguous rectangular regions each extending the length of said film and each including a red coded rectangular portion of a first width, a blue coded rectangular portion of a second width differing from said first width and a green coded rectangular portion of a width differing from said first and second widths comprising:

means for applying a source of light to said film so as to generate a first diffraction pattern for said red coded portions, a second diffraction pattern for said blue coded portions separated from said first pattern and a third diffraction pattern for said green coded portions separated from said first and second patterns, means for detecting at least one of the images of each of said first, second and third patterns, for producing a red image from the image detected from said first pattern, a blue image from the image detected from said second pattern and a green image from the image detected from said third pattern, and for combining said red, blue and green images to reproduce said color images.

11. Apparatus as in claim 10 wherein said detecting, producing and combining means includes a first sensing means positioned for detecting an image of said first pattern, a second sensing means positioned for detecting an image of said second pattern, a third sensing means positioned for detecting an image of said third pattern, a first electron gun responsive to the output of said first sensing means for producing a blue image, and second electron gun responsive to the output of said second sensing means for producing a green image and a third electron gun responsive to the output of said third sensing means for producing a red image.

12. Apparatus as in claim 11 wherein each of said sensing means is a photomultiplier.

13. Apparatus as in claim 11 wherein each of said sensing means is television camera.

* * * * *